2 Sheets—Sheet 1.
H. GREEN.
Harvester.
No. 563.
Reissued May 25, 1858.
Fig. 1,
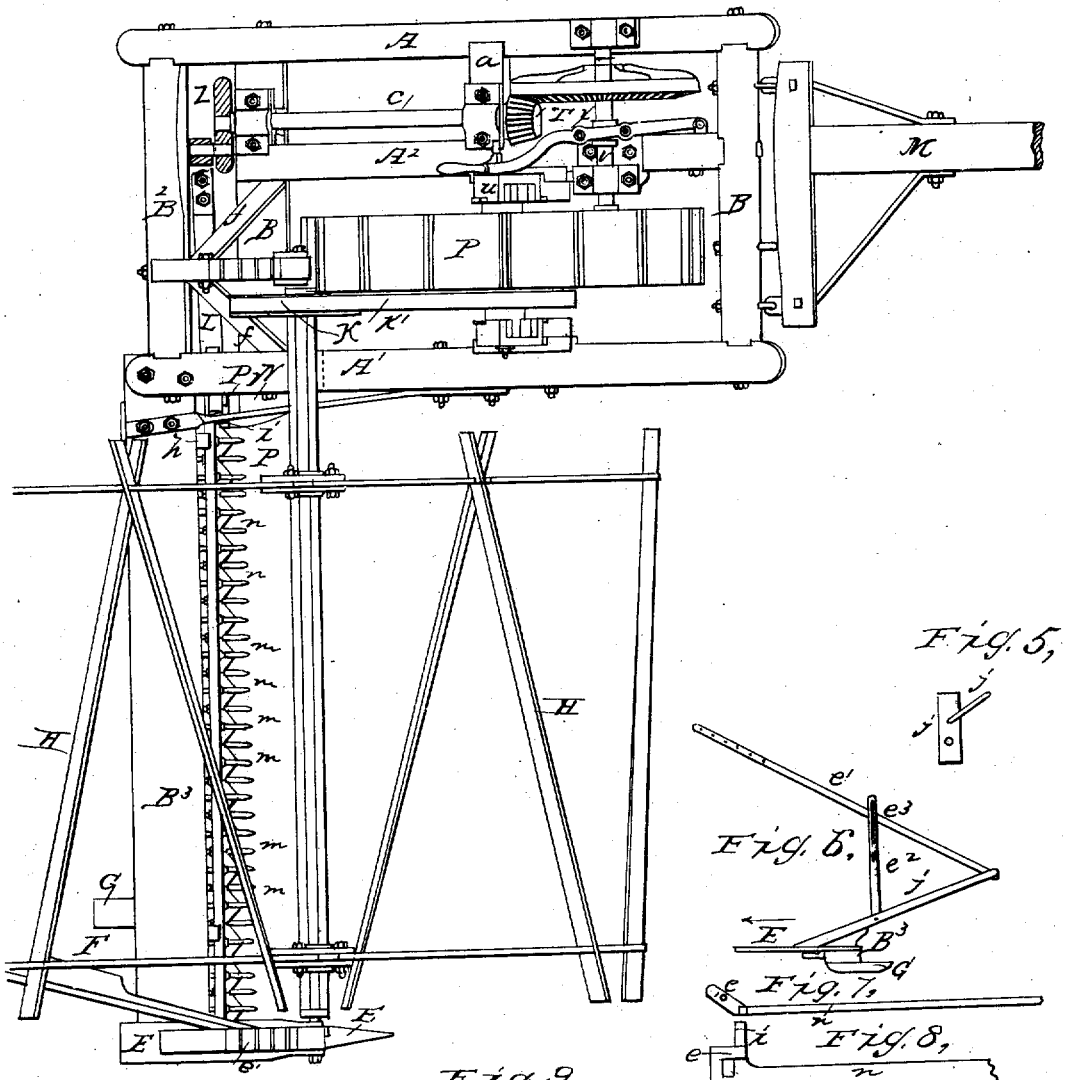
Fig. 5,
Fig. 6,
Fig. 7,
Fig. 8,
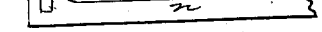
Fig. 9,
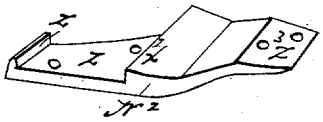
N. PETERS, Photo-Lithographer, Washington, D. C.

2 Sheets—Sheet 2.
H. GREEN.
Harvester.
No. 563.
Reissued May 25, 1858.
Fig. 2,
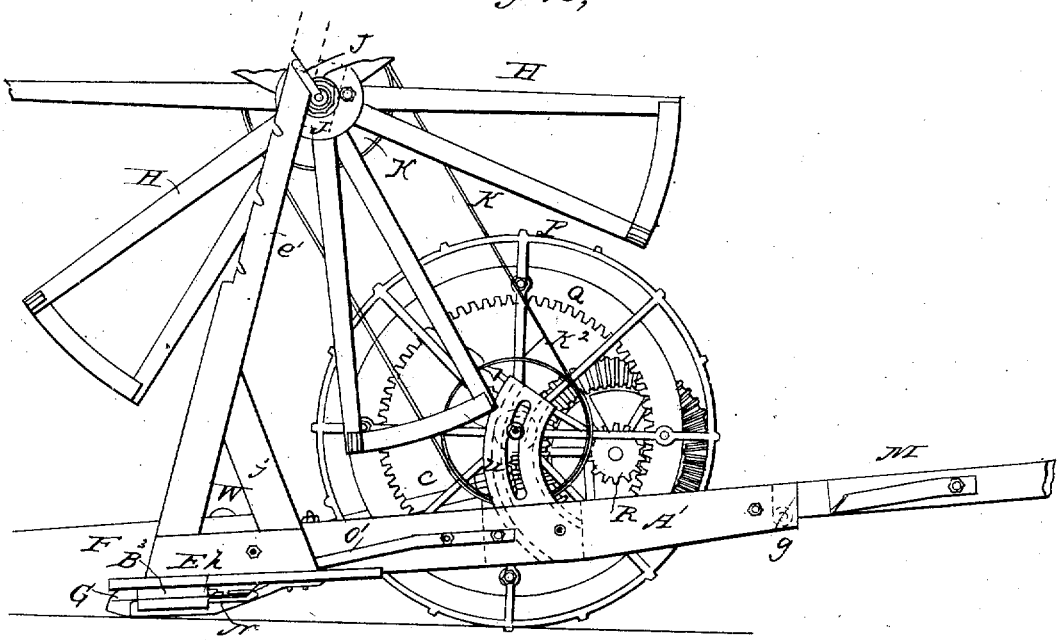
Fig. 3,
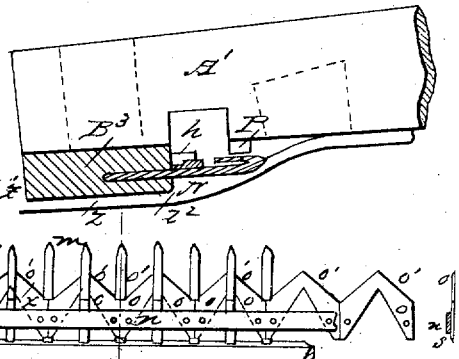
Fig. 4,
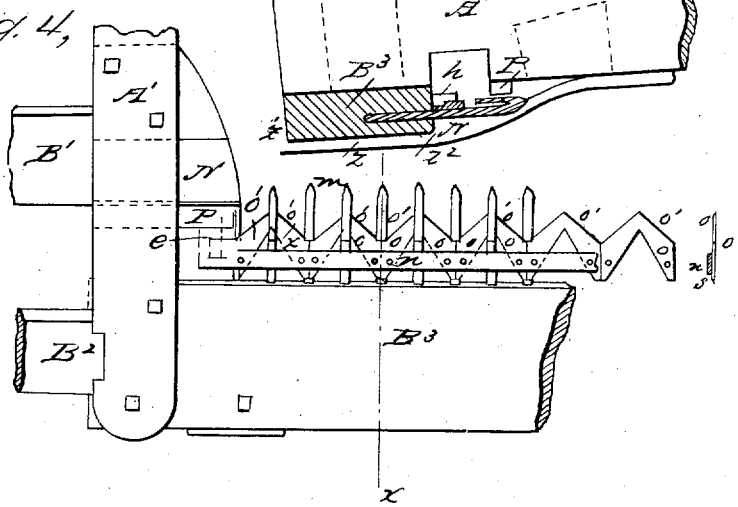
N. PETERS, Photo-Lithographer, Washington, D. C.

UNITED STATES PATENT OFFICE.

HENRY GREEN, OF OTTAWA, ILLINOIS.

IMPROVEMENT IN REEL-SUPPORTS IN MOWING-MACHINES.

Specification forming part of Letters Patent No. 10,657, dated March 21, 1854; antedated September 21, 1853; Reissue No. 563, dated May 25, 1858.

DIVISION No. 3.

*To all whom it may concern:*

Be it known that I, HENRY GREEN, of Ottawa, in the county of La Salle and State of Illinois, have invented a new and useful Improvement in Machines Adapted to Mowing, of which the following is a full, clear, and exact description, reference being had to the accompanying drawings, which make part of this specification, and in which—

Figure 1 represents a plan of a harvesting-machine (as arranged for mowing grass) which embraces my improvement. Fig. 2 represents an elevation of the machine as seen when looking at it toward that end which runs next the standing grain or grass. Fig. 3 represents a section through the finger-beam at the line *x x* of Fig. 4 and an elevation of the shoe and of the adjacent parts of the frame, showing principally the manner in which the finger-beam is connected by means of the shoe to the frame. Fig. 4 represents a plan of the parts shown in Fig. 3. Fig. 5 represents a box, J, for the journal of the reel-shaft and a stirrup, J′, for suspending this box to the reel-post. Fig. 6 represents an arrangement of inclined arms which is deemed preferable in most cases to the post shown in Figs. 1 and 2 for supporting the axle of the reel over the divider. Fig. 7 represents an elevation of the back, and Fig. 8 a plan of that end of the bar *n* of the sickle which is shown in Fig. 4; and Fig. 9 represents a view in perspective of the shoe for connecting the finger-beam and gear-frame.

Of the above-mentioned figures, Figs. 1, 2, and 5 are made according to the scale of feet represented on the drawings, Figs. 3, 4, 7, and 8 upon a larger and Fig. 6 upon a smaller scale, and Fig. 9 upon a scale different from that of any of the rest of the figures.

In machines adapted to mowing grass it has been deemed a desideratum to combine a reel with the cutting apparatus, and various modes of supporting that end of the reel next the divider of the machine have been devised. In one class of machines a strong frame has been extended backward from the end of the finger-beam in the rear of the divider, and to support the weight of this heavy frame a wheel has been secured to it, commonly called the "grain-wheel," to distinguish it from the driving-wheel. Upon this end frame a post has been erected, and an arm projecting forward from the top of the post has been used to support the reel. As the end frame just described is objectionable on account of its weight and cost and the increased draft which it produces at the outer end of the finger-beam, a post erected upon the outer end of the finger-beam has been essayed; but the grass and grain get entangled upon a post in this position to such a degree as to obstruct the action of the divider, and even clog the machine to an extent that greatly impairs its usefulness, if it does not prevent its use altogether. With a view to attain the advantages of both these classes of machines, and at the same time to avoid their defects, I have invented a method of supporting the reel on the end of the finger-beam by a combination of two arms, one above the other, the lowermost of which is attached at its forward extremity, in a low position, to the end of the finger-beam, or immediately over the end of the finger-beam to the divider, and is extended backward and inclined upward until it reaches a convenient position for supporting the rear end of the upper arm, on which the reel is hung. The rear ends of the two arms are hinged together, and the upper arm, from the point of junction with the lower, extends forward and inclines upward until it reaches the foremost point at which the reel is required to be held. A short distance in advance of the point of junction of the two arms a bar extends across the angle and connects them, being hinged at its lower end to the lower arm, and having at its upper end a slot, through which a set-screw passes to connect it to the upper arm. The slot is of sufficient length to allow the front end of the upper arm to be raised or lowered to hold the reel at the various distances from the cutter which are required, and the arm is secured at the proper height by turning the set-screw. The two arms thus arranged support the reel in the same manner that they would if made of one single piece, which in like manner receded backward below to avoid entangling the grass or grain and extended forward at the top to support the reel. The adjustment of the two arms is merely to increase their capacity for holding the reel in different positions, and the cross-bar is merely a means for adjusting them. Under this arrangement the weight of the reel-support is but little more than that of a straight post on the end of the finger-beam, and the weight of the two arms in the rear of the finger-beam so nearly balances the end of the reel as to prevent to a great degree twisting of the finger-beam by the overhanging weight of the reel. Moreover, the grass is no more liable to entangle upon the lower arm than it would be to entangle on the end frame and a post rising from the rear part of that. By thus avoiding the entanglement of the grass upon its foot the lower arm leaves the divider unobstructed and free to perform its function.

This improvement relates to the support of the reel at that end of a machine adapted to mowing which runs next the standing grass, and Fig. 6 in the drawing represents an elevation of that end of the machine embodying this improvement. The remaining figures in the drawings represent the gearing, gear-frame, draft-pole, cutter, guard-fingers, finger-beam, separator E, and reel H, and other parts of a complete mowing-machine in which the reel is upheld by a post, *e*; but as the invention which is herein claimed relates solely to the kind of reel-support shown in Fig. 6, and is applicable to all machines adapted to mowing that have a reel, I deem it unnecessary to describe particularly the parts shown in the other figures, as they have no bearing upon this invention.

The reel H, at its end next the driving wheel and gearing, as shown in Fig. 1, is supported by a post or standard, *e*, which rises from the cross-bar $B^2$ of the frame. This standard is stayed by braces *f f*, extending to it from the cross-bar B′ of the frame. The outer end of the reel may, as shown in Fig. 2, be supported by a like post, *e′*, erected on the outer end of the finger-beam; but a far better way of supporting this end of the reel is shown in Fig. 6, where it is upheld on an arm, *e′*, connected at its rear end with another arm, *j*, which is fastened by means of bolts to the outer end of the finger-beam $B^3$ and the divider or separator E. The arm *e′* is raised or lowered at its front end to adjust the height of the reel by turning it on the pin *e″*, which hinges it to the arm *j*, and when at the desired elevation it may be there held by means of a slotted bar, $e^2$, which is clamped by means of a set-screw, $e^3$, to one arm and attached by a hinge, $e^4$, to the other.

A shoe or runner, G, is fastened to the finger-beam to support its outer end and lessen the friction as it slides over the ground.

Having thus described my improvement, what I claim under this patent as my invention in machines adapted to mowing is—

The method of supporting the reel upon the end of the finger-beam without obstructing the action of the divider by means of inclined arms, substantially as described.

In testimony whereof I have hereunto subscribed my name.

HENRY GREEN.

In presence of—
P. H. WATSON,
HENRY BALDWIN, Jr.